(12) United States Patent
Lyne

(10) Patent No.: US 10,556,795 B2
(45) Date of Patent: Feb. 11, 2020

(54) SINGLE CONTACT, SINGLE ABSORPTION SYSTEM FOR PRODUCING SULFURIC ACID WITH HIGH CONVERSION EFFICIENCY

(71) Applicant: Chemetics Inc., Vancouver (CA)

(72) Inventor: Graham Lyne, Gibsons (CA)

(73) Assignee: CHEMETICS INC., Vancouver (CA)

( * ) Notice: Subject to any disclaimer, the term of this patent is extended or adjusted under 35 U.S.C. 154(b) by 0 days.

(21) Appl. No.: 15/976,322

(22) Filed: May 10, 2018

(65) Prior Publication Data

US 2019/0047860 A1  Feb. 14, 2019

Related U.S. Application Data

(63) Continuation of application No. 15/317,523, filed as application No. PCT/US2015/030515 on May 13, 2015, now Pat. No. 9,994,451.

(Continued)

(51) Int. Cl.

| | | |
|---|---|---|
| *C01B 17/79* | (2006.01) | |
| *C01B 17/765* | (2006.01) | |

(Continued)

(52) U.S. Cl.

CPC .............. *C01B 17/79* (2013.01); *B01J 23/22* (2013.01); *B01J 23/42* (2013.01); *B01J 35/0006* (2013.01);

(Continued)

(58) Field of Classification Search

CPC ......... C01B 17/69; C01B 17/74; C01B 17/76; C01B 17/765; C01B 17/78; C01B 17/79; C01B 17/80; C01B 17/803

See application file for complete search history.

(56) References Cited

U.S. PATENT DOCUMENTS

| | | |
|---|---|---|
| 1,450,661 A | 4/1923 | Audianne |
| 1,965,963 A | 7/1934 | Merriam |
| | (Continued) | |

FOREIGN PATENT DOCUMENTS

| | | |
|---|---|---|
| CA | 2 277 678 A1 | 1/2001 |
| DE | 343792 | 11/1921 |
| | (Continued) | |

OTHER PUBLICATIONS

Louie, Handbook of Sulphuric Acid Manufacturing, (DKL Engineering, Inc., Thornhill, Ontario, 2005) Table of Contents, obtained from: https://books.google.ca/books/about/Handbook_of_Sulphuric_Acid_Manufacturing.html?id=X-s2xn-r_kwC on Dec. 7, 2016.

(Continued)

*Primary Examiner* — Timothy C Vanoy
(74) *Attorney, Agent, or Firm* — Seed IP Law Group LLP

(57) ABSTRACT

Commercial production of sulfuric acid is almost entirely accomplished nowadays using the contact process. And the trend is to increase conversion efficiency and reduce emissions of unconverted sulfur dioxide. By using a special combination of contact catalyst beds, a single contact single absorption (SCSA) system can be engineered to achieve the conversion and emission capabilities of conventional double contact double absorption systems. Thus, the complexity and cost of incorporating a second absorption tower and associated heat exchanger in the system can be omitted. In the SCSA system, the initial catalyst bed or beds comprise vanadium oxide catalyst and the last catalyst bed or beds comprise platinum catalyst operating at a much lower temperature than the initial beds.

11 Claims, 1 Drawing Sheet

Related U.S. Application Data

(60) Provisional application No. 62/009,892, filed on Jun. 9, 2014.

(51) Int. Cl.

| | | |
|---|---|---|
| *C01B 17/80* | (2006.01) | |
| *B01J 35/02* | (2006.01) | |
| *B01J 37/04* | (2006.01) | |
| *B01J 23/42* | (2006.01) | |
| *B01J 35/00* | (2006.01) | |
| *B01J 23/22* | (2006.01) | |
| *B01J 35/04* | (2006.01) | |
| *B01J 37/02* | (2006.01) | |

(52) U.S. Cl.
CPC ............ *B01J 35/02* (2013.01); *B01J 35/04* (2013.01); *B01J 37/0215* (2013.01); *C01B 17/765* (2013.01); *C01B 17/803* (2013.01); *C01B 17/806* (2013.01)

(56) References Cited

U.S. PATENT DOCUMENTS

| | | |
|---|---|---|
| 2,042,675 A | 6/1936 | Merriam |
| 2,195,738 A | 4/1940 | Ridler et al. |
| 5,175,136 A | 12/1992 | Felthouse |
| 7,472,936 B2 | 1/2009 | Whittenberger et al. |
| 7,565,743 B2 | 7/2009 | Whittenberger et al. |
| 7,566,487 B2 | 7/2009 | Feinstein |
| 7,682,580 B2 | 3/2010 | Whittenberger et al. |
| 7,871,593 B2 | 1/2011 | Erkes et al. |
| 9,994,451 B2 * | 6/2018 | Lyne .................. B01J 23/42 |
| 2008/0226540 A1 | 9/2008 | Felthouse et al. |
| 2012/0149944 A1 | 6/2012 | Zmierczak et al. |

FOREIGN PATENT DOCUMENTS

| | | |
|---|---|---|
| GB | 373029 | 5/1932 |
| GB | 1 504 725 | 3/1978 |

OTHER PUBLICATIONS

Mcdonald et al., "George Matthey and the Growth of the British Platinum Industry," *A History of Platinum and its Allied Metals*, (Johnson Matthey) 289-315 (1982).

Sichone, "Optimisation of Anglo Platinum's ACP Acid Plant Catalytic Converter," *The Southern African Institute of Mining and Metallurgy Sulphur and Sulphuric Acid Conference 2009*, 137-146 (2009).

Executive Summary of "Reference Document on Best Available Techniques for the Manufacture of Large Volume Inorganic Chemicals—Ammonia, Acids, and Fertilisers," BS/EIPPCB/LVIC-AAF_Final Draft, Version Oct. 2006, i-x (Oct. 2006) obtained from: http://www.umweltbundesamt.de/sites/default/files/medien/419/dokumente/bvt_anorganische-grundchemikalien-ammoniak-saeuren-duengemittel_zf_1.pdf on Dec. 7, 2016.

* cited by examiner

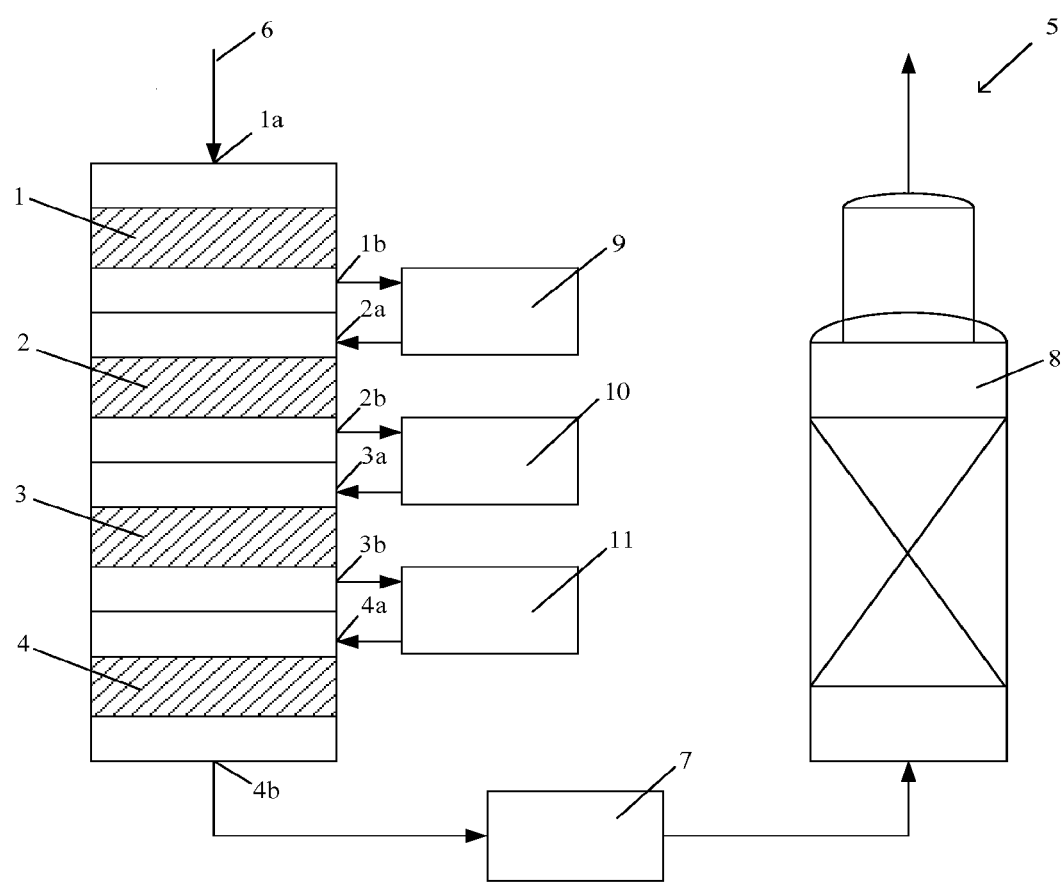

SINGLE CONTACT, SINGLE ABSORPTION SYSTEM FOR PRODUCING SULFURIC ACID WITH HIGH CONVERSION EFFICIENCY

TECHNICAL FIELD

The present invention pertains to systems for oxidizing sulphur dioxide according to the contact process and for producing sulphuric acid thereafter. In particular, it pertains to single contact single absorption systems having high conversion efficiency and low emissions.

BACKGROUND

Sulfuric acid is one of the most produced commodity chemicals in the world and is widely used in the chemical industry and commercial products. Generally, production methods involve converting sulphur dioxide first to sulphur trioxide which is then later converted to sulphuric acid. In 1831, P. Phillips developed the contact process which is used to produce most of today's supply of sulphuric acid.

The basics of the contact process involve obtaining a supply of sulphur dioxide (e.g. commonly obtained by burning sulphur or by roasting sulphide minerals) and then oxidizing the sulphur dioxide with oxygen in the presence of a catalyst (typically vanadium oxide) to accelerate the reaction in order to produce sulphur trioxide. The reaction is reversible and exothermic and it is important to appropriately control the temperature of the gases over the catalyst in order to achieve the desired conversion without damaging the contact apparatus which comprises the catalyst.

Then, the produced sulphur trioxide is absorbed into a concentrated sulphuric acid solution to form a higher strength sulfuric acid solution, which is then diluted with water to return the higher strength solution to the original concentration. This avoids the consequences of directly dissolving sulphur trioxide into water which is a highly exothermic reaction.

While the fundamentals of the contact process are relatively simple, it is desirable to maximize the conversion of sulfur dioxide into sulphuric acid and to minimize the emissions of unconverted sulfur dioxide. Thus, modern plants for producing sulphuric acid often involve multiple contact stages and absorption stages to improve conversion and absorption. Further, the plants often involve complex heat exchanger arrangements to improve energy efficiency.

While single contact single absorption (SCSA) systems remain in use, more complex double contact double absorption (DCDA) systems are often employed in order to achieve the ever increasing requirements for higher conversion efficiency and reduced emissions. In a DCDA system, process gases are subjected to two contact and absorption stages in series, (i.e. a first catalytic conversion and subsequent absorption step followed by a second catalytic conversion and absorption step). Details regarding the conventional options available and preferences for sulphuric acid production and the contact process are well known and can be found for instance in "Handbook of Sulfuric Acid Manufacturing", Douglas Louie, ISBN 0-9738992-0-4, 2005, published by DKL Engineering, Inc., Ontario, Canada.

Platinum catalyst was historically used up to the early 1900s in systems for producing sulfuric acid by the contact process but had certain technical, availability, and economic disadvantages. The platinum catalyst could be poisoned and suffer a loss in activity by the presence of arsenic impurities from roasting sulphide minerals. Over a century ago, the Mannheim process was developed to overcome these problems. In this process, a first conversion stage uses ferric oxide catalyst followed by a $SO_3$ absorption, and then a second conversion stage uses platinum catalyst and a final $SO_3$ absorption. On the economic side however, platinum was and still is relatively rare and expensive.

Platinum was essentially replaced by more economic vanadium oxide catalysts decades ago. And these vanadium oxide catalysts remain as the predominant catalyst choice for the commercial contact process. However, substantial research has been performed towards finding improved catalysts or combinations of catalysts in order to achieve better conversion, reduce cost, and so on.

For instance, U.S. Pat. No. 5,175,136 discloses a process for the manufacture of sulfuric acid in which a gas stream comprising sulfur dioxide and oxygen is passed through a plurality of preliminary contacting stages, in each of which the gas is contacted with a monolithic catalyst comprising a platinum active phase, thereby converting a substantial fraction of the sulfur dioxide in the gas stream to sulfur trioxide. The gas stream leaving one of the plurality of preliminary contacting stages is contacted with sulfuric acid in an absorption zone to remove sulfur trioxide from the stream by absorption in the sulfuric acid. After having passed through the plurality of preliminary stages and the absorption zone, the gas stream is passed through a final contacting stage in which it is contacted with a particulate catalyst comprising vanadium and cesium, thereby substantially converting residual sulfur dioxide in the gas to sulfur trioxide. Platinum was not used at low temperatures and low sulfur dioxide concentrations.

As another example, US2008/0226540 discloses certain ruthenium oxide catalysts that are used in final contact stage for conversion of $SO_2$ to $SO_3$ in multiple stage catalytic converters used in sulfuric acid manufacture. The ruthenium oxide catalysts here provide improved low temperature conversion. In yet another example, improved emissions using specific combinations of cesium-promoted and conventional vanadium pentoxide catalysts was disclosed in "Optimisation of Anglo Platinum's ACP Acid Plant Catalytic Converter", M. Sichone, The Southern African Institute of Mining and Metallurgy, Sulphur and Sulphuric Acid Conference 2009.

The contact process can be carried out under adiabatic or isothermal conditions. Most commonly, commercial sulphuric acid plants operate under adiabatic conditions, although isothermal operation can offer potential advantages in principle. GB1504725 for instance discloses a process which may be isothermal for the manufacture of sulfur trioxide, which comprises contacting technically pure sulfur dioxide and oxygen in a tubular heat exchanger in the presence of a suitable catalyst. Nearly pure $SO_3$ can generally be obtained. A catalyst based on vanadium pentoxide is particularly suitable for this process. However, a platinum catalyst and an iron oxide catalyst may also be used. A suitable operating temperature for a $V_2O_5$ catalyst is from 420 to 630° C., for a $Fe_2O_3$ catalyst from 500 to 780° C. and for a platinum catalyst from 400 to 750° C. If a platinum catalyst is used, those surfaces of the heat exchanger bounding the reaction zone may for example be coated with platinum, a platinum network may be hung into the reaction zone, for example parallel to the axis of the heat exchanger tubes or the reaction zone may be filled with spirally rolled nets. The heat exchanger reaction tube is preferably filled with the catalyst in lump form. Oxidation and heat development occur inside this heat exchanger tube, the heat of the reaction is conducted off directly via the tube walls and consequently the process is isothermal.

Another approach for isothermal or "pseudoisothermal" operation was suggested in U.S. Pat. No. 7,871,593 which discloses a process for the continuous catalytic complete or partial oxidation of a starting gas containing from 0.1 to 66% by volume of sulphur dioxide plus oxygen, in which the catalyst is kept active by means of pseudoisothermal process conditions with introduction or removal of energy. Apparatus for the continuous catalytic complete or partial oxidation of a starting gas containing sulphur dioxide and oxygen having at least one tube contact apparatus is disclosed in the form of an upright heat exchanger composed of at least one double-walled tube whose catalyst-filled inner tube forms a reaction tube. Heat is transferred in cocurrent fashion around the reaction tube using an externally supplied cooling medium (such as air). Objects of the invention were to make possible the inexpensive preparation of sulphuric acid for concentrated starting gases having sulphur dioxide contents of >13.5% by volume and also to provide an economically ecological process for sulphur dioxide-containing offgases from various chemical processes.

Notwithstanding the work done to date in the art, there remains a need for yet further improvements in conversion and energy efficiency, and reductions in emissions and cost in the industrial production of sulphuric acid. The present invention addresses this need and provides other benefits as disclosed below.

SUMMARY

In the present invention, a single contact, single absorption (SCSA) system for oxidizing sulfur dioxide to produce sulfuric acid is disclosed which can provide the same conversion efficiencies and/or sulfur dioxide emissions of conventional double contact double absorption (DCDA) systems. Thus the additional complexity and equipment requirements of DCDA systems are avoided, and particularly the requirement for a second absorption tower and associated heat exchanger subsystem can be omitted. Consequently, the overall system can be simplified, and energy and capital cost benefits can be obtained.

Specifically, the SCSA system for oxidizing sulfur dioxide to produce sulfuric acid comprises an inlet for a gas supply comprising sulfur dioxide and oxygen, a series of contact catalyst beds, an absorption tower, and a sulfur trioxide heat exchanger. The SCSA system is unique in that the series of contact catalyst beds comprises one or more vanadium oxide catalyst beds fluidly connected in series to the gas supply inlet and one or more platinum catalyst beds fluidly connected in series to (or alternatively replacing) the last vanadium oxide catalyst bed in the series of vanadium oxide catalyst beds. Each of the contact catalyst beds in the system comprises an inlet and outlet. The system additionally comprises a platinum catalyst bed heat exchanger with one side connected between the outlet of the last vanadium oxide catalyst bed in the series and the inlet of the first platinum catalyst bed in the series. The system may comprise additional heat exchangers, such as a vanadium oxide catalyst bed heat exchanger or exchangers in which one side is connected between the outlet of one of the vanadium oxide catalyst beds in the series and the inlet of the next one of the vanadium oxide catalyst beds in the series. The absorption tower has an inlet that is fluidly connected to the outlet of the last platinum catalyst bed in the series. And the sulfur trioxide heat exchanger has one side connected between the outlet of the last platinum catalyst bed in the series and the absorption tower inlet.

Because platinum catalyst is catalytically active at lower temperatures than conventional vanadium oxide catalyst, the final platinum based contact catalyst bed or beds in the series can be operated at lower temperatures and thereby obtain a more favorable final stage conversion of sulfur dioxide from the system. However, the initial conversion stages of sulfur dioxide can still desirably be accomplished using conventional vanadium oxide catalyst. Further, the platinum contact catalyst bed or beds in the series are protected against poisoning from any arsenic or other impurities in the gas supply by the initial vanadium oxide based contact catalyst bed or beds.

In one embodiment, the series of vanadium oxide catalyst beds in the SCSA system consists of three vanadium oxide catalyst beds. In another embodiment, the series of vanadium oxide catalyst beds can consist of four vanadium oxide catalyst beds. In yet other embodiments, a different number of vanadium oxide catalyst beds may be considered. In an exemplary embodiment, the series of platinum catalyst beds in the SCSA system consists of just one platinum catalyst bed. However, in other embodiments more than one platinum catalyst bed may be used. An optional scrubber which is fluidly connected to the outlet of the absorption tower may also be used in any of these systems.

The platinum catalyst can be provided in the form of pellets. Alternatively, the platinum catalyst can be coated onto a surface selected from the group consisting mesh, monoliths, and tube inserts. The contact converter comprising the platinum catalyst bed can be in the form of an adiabatic, an isothermal, or a quasi-isothermal (e.g. pseudoisothermal) converter. The construction of the converter can be tubular or plate type and can essentially be constructed as a heat exchanger with catalyst incorporated therein.

Improved conversion efficiency is obtained in the aforementioned SCSA system by directing a gas stream comprising sulfur dioxide and oxygen to the gas supply inlet at a vanadium oxide catalyst activation temperature, passing the gas stream through the series of vanadium oxide catalyst beds thereby converting sulfur dioxide in the gas stream to sulfur trioxide, cooling the gas stream from the outlet of the last vanadium oxide catalyst bed in the series of vanadium oxide catalyst beds in the platinum catalyst bed heat exchanger to a platinum catalyst activation temperature in the range from about 250 to 350° C., passing the gas stream through the series of platinum catalyst beds thereby converting sulfur dioxide in the gas stream to sulfur trioxide, and absorbing the sulfur trioxide in the gas stream into water in the absorption tower, thereby producing sulfuric acid.

The method is suitable for use with gas supplies in which the concentration of sulfur dioxide is greater than or equal to 3%, and particularly greater than or equal to 11%. Further, the method is suitable for use with gas supplies comprising arsenic impurity, e.g. metallurgical gas supplies obtained from roasting sulphide minerals.

Significantly, the platinum catalyst activation temperature is lower than the vanadium oxide catalyst activation temperature. As mentioned, the former is in the range from about 250 to 350° C., and preferably in the range from about 275 to 325° C. The latter is in the conventional range from about 385 to 425° C. Generally, the temperature of the gas stream from the outlet of the last vanadium oxide catalyst bed in the series is in the range from about 400 to 450° C. Thus, the gas stream is cooled by more than 100° C. in the platinum catalyst bed heat exchanger.

Using the method of the invention, conversion efficiencies and sulfur dioxide emissions typical of a conventional DCDA system can be obtained in a simpler SCSA system.

For instance in the present SCSA system, greater than 99.7% of the sulfur dioxide in the gas stream can be converted to sulfur trioxide and the gas stream can comprise less than 450 ppmv after passing the gas stream through the series of platinum catalyst beds. Advantageously, the method can comprise recovering greater than or equal to 95% of the relatively expensive platinum catalyst in the single contact, single absorption system at the end of its life cycle.

BRIEF DESCRIPTION OF THE DRAWINGS

FIG. 1 shows a schematic of a single contact single absorption system for producing sulphuric acid. A prior art SCSA system differs from that of the present invention in the types of catalyst used in the series of contact catalyst beds.

DETAILED DESCRIPTION

Unless the context requires otherwise, throughout this specification and claims, the words "comprise", "comprising" and the like are to be construed in an open, inclusive sense. The words "a", "an", and the like are to be considered as meaning at least one and are not limited to just one.

In a numerical context, the word "about" is to be construed as meaning plus or minus 10%.

The term "catalyst bed" has been used herein to refer to a mass or collection of catalyst. It can be in the form of a pile, layer, coating, or any other arrangement of catalyst mass. It is not intended to limit the form or manner in which the catalyst has been compiled.

Further, "platinum catalyst" and "platinum catalyst bed" refer herein to catalyst or a catalyst bed comprising platinum which can be in the form of platinum metal, platinum oxides or alloys, and which can also comprise metal oxide promoters or the like.

The heat exchangers referred to herein are devices for exchanging heat between two different fluids and are considered to have two sides separated by a heat exchange surface. Each of the different fluids is directed to a different side in the heat exchanger and heat is exchanged between the two through the heat exchange surface.

FIG. 1 shows a schematic of a SCSA system for oxidizing sulfur dioxide to produce sulphuric acid. The general construction and configuration of a SCSA system of the invention is similar to that of a prior art SCSA system, and thus the schematic of FIG. 1 is common to both. Where they differ is in the types of and arrangement of the contact catalyst beds used.

As shown, SCSA system 5 includes contact converter 12 which comprises four contact catalyst beds 1, 2, 3, 4 in series. Each contact catalyst bed has an inlet, namely 1a, 2a, 3a, 4a and an outlet, namely 1b, 2b, 3b, 4b. System 5 also comprises inlet 6 for a gas supply comprising an appropriate mixture of sulfur dioxide and oxygen (e.g. 12% $SO_2$, 12% $O_2$ in $N_2$). And system 5 comprises absorption tower 8 and sulfur trioxide heat exchanger 7. Outlet 4b of the last contact catalyst bed 4 in the series is fluidly connected to one side of sulfur trioxide heat exchanger 7, which in turn is fluidly connected to the inlet of absorption tower 8.

In the embodiment of FIG. 1, system 5 also comprises a heat exchanger between each pair of contact catalyst beds in the series of beds. Specifically, catalyst bed heat exchanger 9 is connected between outlet 1b of contact catalyst bed 1 and inlet 2a of contact catalyst bed 2. Catalyst bed heat exchanger 10 is connected between outlet 2b of contact catalyst bed 2 and inlet 3a of contact catalyst bed 3. And catalyst bed heat exchanger 11 is connected between outlet 3b of contact catalyst bed 3 and inlet 4a of contact catalyst bed 4.

In a typical commercial SCSA system of the prior art, contact catalyst beds 1, 2, 3, and 4 are all vanadium oxide based catalyst beds. In the invention however, one or more of the final contact catalyst beds in the series are instead platinum based catalyst beds. For instance, in an exemplary embodiment of the invention, the last contact catalyst bed 4 in the series is a platinum based catalyst bed, while the others remain vanadium oxide based.

Unlike conventional vanadium oxide catalyst, platinum will initiate catalyst activity and maintain a practical rate of conversion at lower temperatures (e.g. at or below 350° C.) in the last contact catalyst bed. Thus, improved efficiencies can be obtained. Platinum generally initiates catalytic activity at lower temperatures than conventional beds. Further however, the reaction rate of platinum is roughly independent of the oxygen concentration and thus conversion can still proceed at a practical level even though the oxygen concentration in the last catalyst bed is much lower than in the initial beds. (On the other hand, the reaction rate of conventional vanadium oxide catalyst is roughly proportional to the oxygen concentration and thus conversion proceeds much slower in a last vanadium oxide bed.) Further still, the reaction rate of platinum roughly varies as the inverse of the square root of the sulfur trioxide concentration and thus again conversion can still proceed at a practical level even though the sulfur trioxide concentration in the last catalyst bed is significantly higher than in the initial beds. (On the other hand, the reaction rate of conventional vanadium oxide catalyst varies roughly as the inverse of the sulfur trioxide concentration and thus again conversion proceeds much slower in a last vanadium oxide bed.)

The SCSA systems of the invention thus differ from those of the prior art in terms of the operating parameters employed for the last platinum catalyst bed or beds in the series. Specifically, the platinum catalyst is operated at substantially lower temperatures than vanadium oxide catalyst is operated at. An advantage of platinum catalyst is that it is catalytically active to much lower temperatures than are vanadium oxide catalysts. The equilibrium characteristics for sulfur dioxide conversion favour more complete conversion at temperatures below the lower operating limit of vanadium oxide catalyst. Thus, operating the final platinum based contact catalyst bed at temperatures much below the conventional limit of about 385° C. can provide for improved system conversion and thus emissions. The known disadvantage of poisoning of the platinum catalyst by arsenic is overcome by retaining vanadium oxide catalyst in the initial beds in the system. These initial vanadium oxide based contact catalyst beds protect the downstream platinum contact catalyst bed from poisoning from any arsenic or other relevant impurities. Although additional cost is expected with the use of platinum in place of vanadium oxide, the extra cost is not as substantial if only replacing a final contact catalyst bed with platinum when compared to replacing all the contact catalyst beds with platinum. And importantly, the inventors have discovered that using platinum catalyst in a select final bed or beds can allow for a SCSA system to provide product with conversion efficiency and emissions comparable or better to more complex and expensive DCSA systems.

In the exemplary embodiment of the invention then, contact catalyst beds 1, 2, and 3 are vanadium oxide contact catalyst beds while contact catalyst bed 4 is a platinum contact catalyst bed. A gas supply comprising $SO_2$ and $O_2$ is obtained from a suitable source (e.g. roasting or sulfur burning source) at a temperature in the range from about 100 to 420° C. A wide range of $SO_2$ concentrations can be processed using the inventive method (e.g. [$SO_2$] greater than or equal to 3%). Advantageously, gas supplies comprising greater than or equal to 11% $SO_2$ can be processed.

The gas supply is then heated using an appropriate heat exchanger (not shown in FIG. 1) to a vanadium oxide catalyst activation temperature in the range from about 385 to 425° C. The gas supply then is streamed into system 5 at inlet 6 and is directed to inlet 1a of initial vanadium oxide contact catalyst bed 1. A fraction of the sulfur dioxide is exothermically converted to sulfur trioxide within and the gas stream then exits at outlet 1b at a temperature in the range from about 450 to 630° C. (depending on gas concentration). From there, the gas stream is directed to vanadium oxide catalyst bed heat exchanger 9 where it is cooled again to an appropriate vanadium oxide catalyst activation temperature (about 425 to 450° C.). The gas stream is then directed to inlet 2a of the next vanadium oxide contact catalyst bed 2 in the series.

In a like manner, another fraction of the sulfur dioxide is exothermically converted to sulfur trioxide within bed 2. The gas stream exits at outlet 2b at elevated temperature and is directed to vanadium oxide catalyst bed heat exchanger 10, where it is cooled again to the vanadium oxide catalyst activation temperature. The gas stream is then directed to inlet 3a of the next vanadium oxide contact catalyst bed 3 in the series. Again, another fraction of the sulfur dioxide is exothermically converted to sulfur trioxide. The gas stream exits at outlet 3b at elevated temperature (in the range from about 400 to 450° C.), and this time is directed to platinum catalyst bed heat exchanger 11 where it is cooled to the lower platinum catalyst activation temperature in the range from about 250 to 350° C.

The gas stream is then directed to inlet 4a of platinum contact catalyst bed 4, in which sulfur dioxide is converted to sulfur trioxide with very high conversion efficiency (e.g. >99.7%). System 5 thus provides conversion efficiency and emissions comparable to or better than conventional DCDA systems.

The gas stream now contains sulfur trioxide and almost no sulfur dioxide. After exiting outlet 4b, the gas stream is cooled in sulfur trioxide heat exchanger 7 and is then directed to the inlet of absorption tower 8. Therein, the sulfur trioxide is absorbed in water to produce sulfuric acid. The remaining gas is then typically vented from a stack (not shown in FIG. 1). The sulfur dioxide content in the vented gas is very low (e.g. 450 ppmv or lower) and can be comparable or better to the emissions from conventional DCDA systems.

It is expected that the catalyst in such a SCSA system would not need replacing for a significant time (e.g. 5 years or so). And unlike conventional vanadium oxide catalyst, most of the relatively expensive platinum in the catalyst can be recovered at the end of system life (e.g. about 95% recovery).

While the preceding description represents a desirable exemplary embodiment of the invention, it will readily be apparent to those in the art that other configurations employing the above invention are possible. For instance, systems with more than three initial vanadium oxide based contact catalyst beds in series may be contemplated, as can systems with more than one final platinum based contact catalyst bed in series. Further, a scrubber may optionally be employed after the absorption tower.

With regards to contact converter 12, it may be a single unit comprising all the contact catalyst beds in an appropriate arrangement. Alternatively, it may comprise two or more component converters with the contact catalyst beds split up appropriately between them. For instance, the vanadium oxide contact catalyst beds may all be contained in a single converter, while the platinum contact catalyst bed may be contained in a separate adiabatic, isothermal, or quasi-isothermal converter.

A variety of designs may be considered for contact converter 12 and/or the component converters within. Particularly, any conventional arrangement may be employed for the vanadium oxide contact catalyst beds. With regards to the platinum contact catalyst bed, it may be provided in a variety of ways. For instance, platinum catalyst may be provided in pellet form or as coatings on an appropriate surface (e.g. mesh, monoliths, or tube inserts or plates for heat exchanger-like constructions).

As mentioned above, the invention allows sulfur trioxide (and from that sulfuric acid) to be produced in a SCSA system with a conversion efficiency and emissions similar to that obtained from a DCDA system. The extra absorption tower, any associated heat exchanger, piping, and controls that typically appear in a DCDA are no longer needed to obtain similar desirable results.

It will thus be apparent to those in the art that the invention may be used to construct new SCSA systems as well as to retrofit existing conventional SCSA systems such that conversion efficiency and emissions similar to a DCDA system is obtained. For instance, a suitable retrofit of a conventional SCSA system can merely involve replacement of a fourth conventional vanadium oxide based, contact catalyst bed with a platinum based, contact catalyst bed, and modification of heat exchangers and system controls such that the operating temperatures are changed appropriately.

Further, it will be apparent to those in the art that similar benefits in conversion efficiency and emissions can be expected when employing a platinum contact catalyst bed or beds after the intermediate absorption tower in a DCDA system.

The following Example has been included to illustrate certain aspects of the invention but should not be construed as limiting in any way.

EXAMPLES

Calculations were made to determine the expected performance from an otherwise conventional SCSA system that had been retrofitted to include a final platinum catalyst based bed according to the invention.

The conventional SCSA system was assumed to have a capacity of about 2000 metric tons per day. A metallurgical supply of gas was assumed as the feed gas and contained 11.5% $SO_2$ with a 1:1 $O_2/SO_2$ ratio. This feed gas was supplied at about $1.6 \times 10^5$ $Nm^3/hr$. The SCSA system was further assumed to comprise four conventional vanadium oxide based catalyst beds in series. The feed gas was supplied to the first bed at 420° C. and about 0.26 barg, and exited the last bed at about 446° C. and about 0.16 barg. Such a conventional system can produce sulfur trioxide product with 95% conversion efficiency.

For calculation purposes, this SCSA system was then considered to have been retrofitted to include an additional (i.e. $5^{th}$) catalyst bed in series with the $4^{th}$ conventional bed. The additional bed was assumed to contain standard pellet catalyst comprising about 350 kg of platinum and also a certain amount of metal oxide promoter. In addition, the system also included an additional heat exchanger between the 4th conventional bed and the additional platinum based catalyst bed (similar to platinum catalyst bed heat exchanger 11 in FIG. 1).

The same feed gas supply and operating conditions for the 5 conventional beds was assumed. After being cooled by the additional heat exchanger, gas entered the 5th platinum based catalyst bed at 300° C. and about 0.13 barg, and exited the last bed at about 317° C. and about 0.10 barg. Under these conditions, it is expected that a 98.2% approach to equilibrium can be attained. The retrofitted system is then expected to produce sulfur trioxide product with 99.85% conversion efficiency and with sulfur dioxide emissions less than 220 ppmv. It is expected that the catalyst in this system would not need replacing for about 5 years, at which point about 95% of the platinum in the catalyst could be recovered. Hence the system can provide desirable conversion efficiencies and emissions and further is viable economically.

All of the above U.S. patents, U.S. patent applications, foreign patents, foreign patent applications and non-patent publications referred to in this specification, are incorporated herein by reference in their entirety.

While particular elements, embodiments and applications of the present invention have been shown and described, it will be understood, of course, that the invention is not limited thereto since modifications may be made by those skilled in the art without departing from the spirit and scope of the present disclosure, particularly in light of the foregoing teachings. Such modifications are to be considered within the purview and scope of the claims appended hereto.

The invention claimed is:

1. A method for improving conversion efficiency in the production of sulfuric acid by oxidizing sulfur dioxide in a single contact, single absorption system, the method comprising:
   providing the single contact, single absorption system, comprising:
      an inlet for a gas supply comprising sulfur dioxide and oxygen;
      a series of contact catalyst beds comprising one or more vanadium oxide catalyst beds fluidly connected in series to the gas supply inlet and one or more platinum catalyst beds fluidly connected in series to the last vanadium oxide catalyst bed in the series of vanadium oxide catalyst beds, wherein each of the contact catalyst beds comprises an inlet and outlet;
      a platinum catalyst bed heat exchanger with one side connected between the outlet of the last vanadium oxide catalyst bed in the series and the inlet of the first platinum catalyst bed in the series;
      an absorption tower with an inlet fluidly connected to the outlet of the last platinum catalyst bed in the series; and
      a sulfur trioxide heat exchanger with one side connected between the outlet of the last platinum catalyst bed in the series and the absorption tower inlet;
   directing a gas stream comprising sulfur dioxide and oxygen to the gas supply inlet at a vanadium oxide catalyst activation temperature;
   passing the gas stream through the series of vanadium oxide catalyst beds thereby converting sulfur dioxide in the gas stream to sulfur trioxide;
   cooling the gas stream from the outlet of the last vanadium oxide catalyst bed in the series of vanadium oxide catalyst beds in the platinum catalyst bed heat exchanger to a platinum catalyst activation temperature in the range from about 250 to 350° C.;
   passing the gas stream through the series of platinum catalyst beds thereby converting sulfur dioxide in the gas stream to sulfur trioxide; and
   absorbing the sulfur trioxide in the gas stream into water in the absorption tower, thereby producing sulfuric acid.

2. The method of claim 1 wherein the concentration of sulfur dioxide in the gas supply is greater than or equal to 3%.

3. The method of claim 2 wherein the concentration of sulfur dioxide in the gas supply is greater than or equal to 11%.

4. The method of claim 1 wherein the gas supply comprises arsenic.

5. The method of claim 4 wherein the gas supply is a metallurgical gas supply.

6. The method of claim 1 wherein the platinum catalyst activation temperature is in the range from about 275 to 325° C.

7. The method of claim 1 wherein the vanadium oxide catalyst activation temperature is in the range from about 385 to 425° C.

8. The method of claim 1 wherein the temperature of the gas stream from the outlet of the last vanadium oxide catalyst bed is in the range from about 400 to 450° C.

9. The method of claim 1 wherein greater than 99.7% of the sulfur dioxide in the gas stream is converted to sulfur trioxide after passing the gas stream through the series of platinum catalyst beds.

10. The method of claim 1 wherein the gas stream comprises less than 450 ppmv of sulfur dioxide after passing through the series of platinum catalyst beds.

11. The method of claim 1 comprising recovering greater than or equal to 95% of the platinum in the single contact, single absorption system at the end of its life cycle.

* * * * *